United States Patent
Mentzel (10) Patent No.: US 11,079,034 B2
(45) Date of Patent: Aug. 3, 2021

(54) BALL VALVE FOR A PIPE SYSTEM FOR CONVEYING LIQUID OR GASEOUS MEDIA

(71) Applicant: Franz Schuck GmbH, Steinheim (DE)

(72) Inventor: Elmar Mentzel, Berlin (DE)

(73) Assignee: Franz Schuck GmbH, Steinheim (DE)

( * ) Notice: Subject to any disclaimer, the term of this patent is extended or adjusted under 35 U.S.C. 154(b) by 86 days.

(21) Appl. No.: 16/346,465

(22) PCT Filed: Nov. 3, 2017

(86) PCT No.: PCT/EP2017/078254
§ 371 (c)(1),
(2) Date: Apr. 30, 2019

(87) PCT Pub. No.: WO2018/083278
PCT Pub. Date: May 11, 2018

(65) Prior Publication Data
US 2020/0056716 A1    Feb. 20, 2020

(30) Foreign Application Priority Data

Nov. 4, 2016  (DE) .......................... 102016121087.0
Jul. 28, 2017  (DE) .......................... 102017117167.3

(51) Int. Cl.
*F16K 27/02*  (2006.01)
*F16K 5/06*  (2006.01)
(Continued)

(52) U.S. Cl.
CPC ........ *F16K 27/0245* (2013.01); *F16K 5/0689* (2013.01); *F04B 53/126* (2013.01);
(Continued)

(58) Field of Classification Search
CPC .. F16K 27/0245; F16K 15/044; F16K 5/0689; F16K 5/201; F16K 5/205;
(Continued)

(56) References Cited

U.S. PATENT DOCUMENTS 3,421,733 A * 1/1969 Stewart, Jr. ........... F16K 5/0673
251/172
3,605,789 A * 9/1971 Graham .................. F16K 5/205
137/240
(Continued)

FOREIGN PATENT DOCUMENTS

DE        1283050        11/1968
DE        19510709 A1  *  9/1996  ........... F16K 5/0673
(Continued)

OTHER PUBLICATIONS

Machine Translation of DE19510709A1 retrieved from espacenet.com Nov. 2020 (Year: 2020).*
(Continued)

*Primary Examiner* — Jessica Cahill
(74) *Attorney, Agent, or Firm* — Randall Danskin P.S.

(57) ABSTRACT

The invention relates to a ball valve (1) for a pipe system for conveying liquid or gaseous media, comprising a housing (3), which has a ball plug (4) and seat rings (5, 6). A hydraulic system (7), which is independent of the pressure of the liquid or gaseous medium flowing through the pipe system, is provided for changing the contact pressure of at least one of the seat rings (5, 6) against the ball plug (4).

16 Claims, 5 Drawing Sheets

(51) Int. Cl.
  *F04B 53/12* (2006.01)
  *F16K 5/20* (2006.01)
  *F16K 15/04* (2006.01)
(52) U.S. Cl.
  CPC .............. *F16K 5/201* (2013.01); *F16K 5/205* (2013.01); *F16K 15/044* (2013.01)
(58) Field of Classification Search
  CPC .... F16K 5/20; F04B 53/126; Y10T 137/4259; Y10T 137/4358; Y10T 137/4442
  See application file for complete search history.

(56) References Cited

U.S. PATENT DOCUMENTS

| | | | | |
|---|---|---|---|---|
| 3,617,025 | A * | 11/1971 | Gerbic | F16K 5/205 |
| | | | | 251/172 |
| 3,776,506 | A * | 12/1973 | Fowler | F16K 5/205 |
| | | | | 251/172 |
| 3,856,261 | A * | 12/1974 | Jourdan | F16K 5/205 |
| | | | | 251/172 |
| 3,912,220 | A * | 10/1975 | Vasicek | F16K 5/205 |
| | | | | 251/159 |
| 4,621,656 | A * | 11/1986 | Ichimaru | F16K 27/0263 |
| | | | | 137/242 |
| 5,533,738 | A * | 7/1996 | Hoffmann | F16K 5/201 |
| | | | | 277/388 |
| 7,275,564 | B2 * | 10/2007 | Bazin | F16K 5/201 |
| | | | | 137/625.47 |
| 10,030,784 | B2 * | 7/2018 | Lanning | F16K 5/0689 |
| 10,378,659 | B2 * | 8/2019 | Scott | F16K 3/0281 |
| 2010/0193722 | A1 * | 8/2010 | Jervis | F16K 5/0689 |
| | | | | 251/315.1 |
| 2015/0377366 | A1 * | 12/2015 | Hartman | F16K 5/0689 |
| | | | | 251/180 |

FOREIGN PATENT DOCUMENTS

| | | |
|---|---|---|
| DE | 102007062553 A1 | 7/2009 |
| EP | 0161056 A2 | 11/1985 |
| EP | 0919750 A1 | 6/1999 |
| FR | 2940828 A1 | 7/2010 |

OTHER PUBLICATIONS

PCT Request Form filed in the Priority PCT Patent Application for PCT/EP2017/078254, Nov. 2017.
International Search Report (ISR) for PCT/EP2017/078254, dated Nov. 2017.
Written Opinion of the International Search Authority for PCT/EP2017/078254, dated Nov. 2017.
Notices from the International Bureau regarding receipt of priority documents and record copy, Nov. 2017.

* cited by examiner

BALL VALVE FOR A PIPE SYSTEM FOR CONVEYING LIQUID OR GASEOUS MEDIA

CROSS REFERENCE TO RELATED APPLICATIONS

This application is a national stage application of International App. No. PCT/EP2017/078254, filed on 3 Nov. 2017 and titled "Ball Valve for a Pipe System for Conveying Liquid or Gaseous Media," which claims the benefit of priority to earlier filed German Patent Application No. DE 10 2017 117 167.3, filed on 28 Jul. 2017, and also claims the benefit of priority to earlier filed German Patent Application No. DE 10 2016 121 087.0 filed on 4 Nov. 2016 all of which are hereby incorporated by reference in their entirety.

BACKGROUND AND SUMMARY

The invention relates to a ball valve for a line system for conveying liquid or gaseous media.

The invention also relates to a method for adjusting a ball valve, in which method the ball valve is integrated into a line system for conveying liquid or gaseous media and is adjusted in order to open and close pipelines.

The invention also relates to a method for leading at least one pig through a ball valve inserted into a line system for liquid or gaseous media, wherein the ball valve has a ball plug and seat rings, in which method one or more pigs are led through pipelines into which the ball valve is inserted.

The pigs may in particular be one or more one or more cleaning pigs which are led through the ball valve for cleaning purposes.

The invention also relates to a method for cleaning a ball valve, in which method the ball valve is integrated into a line system for conveying liquid or gaseous media and is adjusted in order to open and close pipelines, in which method the ball valve has a ball plug and seat rings.

Furthermore, the invention relates to a method for sealing a ball valve, in which method the ball valve is integrated into a line system for conveying liquid or gaseous media and is adjusted in order to open and close pipelines, in which method the ball valve has a ball plug and seat rings.

A generic ball valve is known from DE 10 2007 062 553 A1.

Ball valves are used, in a wide variety of dimensions, as shut-off fittings for liquid and gaseous media. The ball valves generally have connection pieces for inserting the ball valves into a line of a line system. The ball valves each have a housing which accommodates a so-called ball plug and seat rings. The pipeline can be opened and closed in a manner dependent on the position of the ball plug in the housing. The rotation of the ball plug is performed by means of an actuating device, which normally has an actuating pin which can be operated manually or in automated fashion in order to rotate the ball plug.

Ball valves may be installed above ground or underground, wherein, in particular in the case of underground installation, subsequent access for maintenance purposes is made more difficult. In the case of underground installation, the actuating device normally extends to the surface in order to ensure ease of operation.

Seat rings are used to seal the ball valve with respect to the pipelines into which the ball valve is installed. The seat rings may impart metallic sealing or soft sealing with respect to the ball plug. Also known from the prior art are seat rings which are primarily metallically sealing and secondarily soft-sealing. Depending on the intended use, use is made of either of soft-sealing, metallically sealing or else primarily metallically sealing and secondarily soft-sealing seat rings. The seat rings generally have a spring device which pushes the seat ring against the ball plug. It is advantageous here if the spring device imparts a force which ensures that the seat ring is reliably pressed against the ball plug when no liquid or gaseous medium flows through the line system or only a low pressure prevails in the line system. As soon as a gaseous or liquid medium flows through the line system, in particular at a high pressure, it is advantageous if, by means of such a channel system, it is ensured that the pressure prevailing in the line system or in the pipelines is used to act on a rear side, averted from the ball plug, of the seat ring, such that the seat ring is pressed against the ball plug in a manner dependent on the pressure prevailing in the line system. This is referred to as differential pressure or differential pressure system.

The advantage of the use of the pressure in the line system in order to press the seat ring against the ball plug consists in that the spring device can be dimensioned to be correspondingly weak in order that the friction caused in the system by the spring device when the ball plug is to be rotated are kept as low as possible. Furthermore, the pressure forces are kept low, and in this way, in particular, the seal system (seat ring/ball plug) is preserved.

This sophisticated system is particularly well-established in practice. The system is advantageous in relation to the use of a spring device with a permanently high pressure force.

Nevertheless, even in the case of the sophisticated system, it would be desirable if the friction at the seal system (seat rings/ball plug) when the ball valve is adjusted could be reduced yet further in order that the wear at the seal system is further reduced and smaller drives can also possibly be used.

The inventors have furthermore identified that, in the case of a basically preferred spring device with a relatively low pressure force, there can be the risk that, in particular during the cleaning of the line system, the sealing function of the seat ring with respect to the ball plug is impaired.

In particular prior to the initial commencement of operation of the line system, it is conventional for so-called pigs (hard rubber balls with brushes) to be led through the entire line system and thus also through the ball plug is used there. Inter alia, cleaning pigs, filling pigs or drying pigs are known. Cleaning pigs run through the pipelines of the line system and clean these of dirt, for example also of metallic welding residues or the like. Here, the cleaning pigs exert a high force on the seat rings. This could result in the seat rings lifting off from the ball plug counter to the spring force of the spring device, which could give rise to the risk of the dirt transported along by the cleaning pig being pushed under the sealing surface of the seat ring, such that the seat ring no longer bears with sealing action against the ball plug.

During the pigging process, there is no assistance by means of the so-called differential pressure. Assistance of the spring device by means of a differential pressure is thus not provided. The seat ring is therefore pressed against the ball plug only with the force of the spring device. Selection of the spring force such that it can, with a corresponding safety margin, resist the force of the pig, and thus a lift-off of the seat ring from the ball plug is prevented in all situations, can disadvantageously have the effect that the friction in the system is very high and in particular the sealing surface (seat rings/ball plug) is damaged, and impaired in terms of its function, by the permanently high pressure.

In particular in the case of underground installation of the ball valve, which is conventional in particular in the case of large ball valves that are used for conveying gas or oil, the accessibility to the ball valve is also impeded.

The present invention is based on the object of solving the disadvantages of the prior art, in particular optimizing a ball valve such that the pressure load on the sealing surface between the seat ring and the ball plug is as low as possible.

The present invention is furthermore based on the object of creating a method for adjusting a ball valve, in the case of which the sealing surface between the ball valve and the seat ring is subjected to the least possible load.

The present invention is also based on the object of creating a method for leading at least one pig through a ball valve inserted into a line system for liquid or gaseous media, in the case of which the ball valve is as far as possible not adversely affected.

The present invention is furthermore based on the object of creating a method for cleaning a ball valve, in the case of which, in particular, the sealing surface or a seat ring gap between the ball valve and the seat ring is reliably freed from deposits.

The invention is furthermore based on the object of providing a method for sealing a ball valve, in particular providing emergency sealing in the case of damage to the sealing surface between one of the seat rings and the ball plug.

The object is achieved with regard to the ball valve by means of the claims.

An advantageous method for adjusting a ball valve in order to open and close pipelines emerges from the claims.

An advantageous method for leading at least one pig through a ball valve inserted into a line system emerges from the claims.

An advantageous method for cleaning a ball valve emerges from the claims.

An advantageous method for sealing a ball valve, in particular for emergency sealing, emerges from the claims.

By virtue of the fact that, according to the invention, a pressure system, in particular a hydraulic system, which is independent of the pressure of the liquid or gaseous medium flowing through the line system, is provided in order to vary the contact pressure of at least one of the seat rings against the ball plug, it is possible, as required, for the force with which the at least one seat ring is pressed against the ball plug to be varied, in particular reduced or increased. This yields various advantages. The solution according to the invention makes it possible for the ball valve to be designed such that, during normal operation of the line system, that is to say if liquid or gaseous medium flows through the line system, reliable sealing between the seat ring and the ball plug is ensured.

In the context of the invention, expressions such as pressure system, pressure channel, medium, pressure, pressure unit and the like are used. The use of such expressions, in particular also in the claims, is intended to illustrate, as will also be stated during the further course of the description, that, for the invention, both liquid and gaseous media may be used for the pressure system and the parts thereof and the functional principle thereof. The invention applies equally to liquid and to gaseous media.

Where, in the context of the invention, in particular in the claims and in the following description, more specific expressions typically indicating a liquid medium, such as hydraulic system, hydraulic channel, hydraulic medium, hydraulic pressure or hydraulic unit, are used instead of the general expressions (for example pressure system, pressure channel, pressure, medium or pressure unit), this is not intended to be understood as ruling out the use of a gaseous medium. The use of these expressions, too, applies equally to the use of liquid or gaseous media for the pressure system according to the invention or the hydraulic system according to the invention, or is to be understood as a disclosure both for the use of liquid and gaseous media.

As stated in the further description, the selection of the medium for the pressure system may preferably be made in a manner dependent on the medium that is transported in the line system or in the pipelines of the line system.

In the context of the invention, provision may be made whereby, if water is transported in pipelines, then a gas, in particular nitrogen, is preferably used as medium for the pressure system.

In this regard, it may be advantageous if, in addition to the differential pressure that acts at a rear side of the ball valve, a spring device is also provided, in order that, even in the presence of relatively low pressures in the line system or if no liquid or gaseous medium is being conveyed through the line system, reliable sealing between the ball plug and the seat ring is ensured.

The solution according to the invention makes it possible, in the event of an adjustment of the ball valve, that is to say if the ball plug is rotated in order to open or close the line system, in particular in order to open or close pipelines of the line system, for the load on the sealing surface between the seat ring and the ball plug to be reduced. This is possible by means of the hydraulic system according to the invention which is independent of the pressure in the line system and by means of which the pressure with which the seat ring is pushed against the ball plug can be increased or reduced.

For the adjustment of the ball valve, provision may be made whereby, already at the start of the adjustment process and/or even during the adjustment process, by means of the hydraulic system, the pressure with which the seat ring is pressed onto the ball plug is reduced. In this way, the friction at the sealing surface between the seat ring and the ball plug and thus also the switching torque is reduced. Instances of damage to the ball valve are thereby considerably reduced or ruled out. The wear and thus the durability and the service life of the ball valve are thus increased. Furthermore, for the adjustment of the ball plug, which is of particular significance in particular in the case of large ball valves, relatively low torques are required, whereby the drive device can also be designed to be smaller.

A further advantage of the invention consists in that, through the reduction of the contact pressure force of the seat ring against the ball plug, any dirt deposits present at the sealing surface, which could have formed for example during the pigging process, can be flushed out or blown out, whereby the dirt deposits cause no damage to the sealing surfaces when the ball plug is rotated.

For this purpose, the seat ring may possibly be lifted off from the ball plug.

The solution according to the invention furthermore makes it possible that, if the seat ring becomes stuck on the ball plug, by means of a reduction of the pressure on the seat ring, the lift-off thereof, and thus the rotation of the ball plug, can be facilitated.

The solution according to the invention makes it possible for the contact pressure of the seat ring on the ball plug to be set, in particular reduced, or else increased, as required.

An increase of the pressure may also be provided for emergency sealing.

An increase of the pressure may be provided in particular when a pig is moved through the pipeline system, in particular for cleaning purposes.

Provision is preferably made for the hydraulic system to be used when the ball valve is adjusted, in particular the ball plug is to be moved between an open position and a closed position (and vice versa), or a pig is moved through the pipeline system.

It is advantageous if, during normal operation or when the ball plug is not moved, the hydraulic system is not used, such that, during normal operation, the contact pressure force is generated by the differential pressure and/or means of a spring device.

By means of the solution according to the invention, the seat rings are controllable individually and in a situation-dependent manner.

Provision is preferably made whereby the two seat rings are each uniformly actuated, or the pressure is correspondingly uniformly controlled. This is however not imperative.

The solution according to the invention makes it possible that, when a cleaning pig runs through the line system, the force with which the seat ring is pressed against the ball plug can be increased such that the cleaning pig cannot lift the seat ring off from the ball plug. A situation is thus prevented in which the cleaning pig pushes the dirt transported along by it, for example metallic deposits, between sealing surface, seat rings and ball, and/or damages the sealing surface of the seat ring. The sealing action between the seat ring and the ball plug is thus not damaged.

As soon as the need for an elevated contact pressure force is no longer present, the hydraulic pressure generated by the hydraulic system, which presses the at least one seat ring against the ball plug, can be further reduced or eliminated entirely. It is thus possible in particular to use a relatively weak spring device, which has been identified as being suitable and which imparts only a force sufficient to press the seat ring reliably against the ball plug in the unpressurized state of the line system or when only a low pressure prevails in the line system.

The function of the spring force may possibly also be jointly performed by the hydraulic system according to the invention, though it is more expedient for a spring device to be used for this purpose.

It is advantageous if, for each seat ring, a spring device is provided for pushing the seat ring against the ball plug.

It is furthermore advantageous if the hydraulic system according to the invention can act on both seat rings with a hydraulic pressure. If the ball plug has more than two seat rings, provision may also be made whereby multiple seat rings are acted on hydraulically.

The invention described below can be realized irrespective of whether one or more seat rings are pushed hydraulically against the ball plug by means of the hydraulic system.

It is basically possible for a dedicated hydraulic system or a dedicated hydraulic pump to be provided for each seat ring. It is however advantageous for a distributor block to be provided to which one common or two or more separate connecting line(s) for the feed of the hydraulic medium to the seat rings is/are connected. Provision may be made here whereby each connecting line has a separately or jointly switchable shut-off valve.

It is advantageous if the hydraulic system comprises at least one hydraulic channel which is suitable for feeding a hydraulic medium to, or discharging said hydraulic medium from, a rear side, averted from the ball plug, of the seat ring in order to vary the hydraulic pressure on the seat ring. The feed to the seat rings can be realized in a particularly simple manner if the housing that surrounds the seat ring has a suitable pause to which lines running outside the housing are then connected.

It is advantageous if an annularly encircling annular space with which the hydraulic channel corresponds is formed between the rear side of the seat ring and an adjacent inner wall surface, facing toward the seat ring, of the housing. The hydraulic channel may preferably be a bore in the housing of the ball valve, or a corresponding bore may form a part of the hydraulic channel.

It is advantageous if the annular space is delimited by a first seal and a second seal which are arranged such that the medium fed from the hydraulic channel generates a hydraulic force which acts directly on the rear side of the seat ring.

The hydraulic system can thus directly influence the contact pressure of the seat ring against the ball plug. It is particularly advantageous here if the hydraulic system cannot only increase but also reduce the pressure in the annular space. That is to say, the hydraulic system can, in particular through the hydraulic channel, also release pressure from the annular space.

Normally, the above-mentioned differential pressure prevails in the annular space which is adjacent to the rear side of a seat ring when a liquid or gaseous medium is transported through the pipelines of the line system. In particular if the ball valve is adjusted, that is to say the ball plug is to be rotated, pressure can be released from the annular space through the hydraulic channel, and thus the contact pressure force of the seat ring against the ball plug can be reduced, through corresponding control of the hydraulic system. For this purpose, measures may be provided which ensure that the pressure in the annular space can be reduced below the pressure in the line system or in the pipelines. This can be achieved in particular by virtue of a connection of the annular space to chambers or spaces in which the pressure of the line system prevails being interrupted or shut off.

In the case of ball valves according to prior art, provision is typically made whereby, in order that the differential pressure system operates, the annular space is connected to a so-called dead space which is situated between the seat rings and a top side of the ball plug and an inner wall surface of the housing.

It is advantageous if the first seal is arranged between the inner wall surface of the housing and the seat ring and seals off the annular space with respect to a dead space, wherein, during the normal operation of the line system, a pressure prevails in the dead space which corresponds to the pressure in pipelines, through which the liquid or gaseous medium is transported, of the line system.

By means of this arrangement of the first seal, the connection, specifically an annularly encircling gap, between the annular space of one of the seat rings and the dead space is sealed off, such that the pressure in the annular space can if necessary be set by means of the hydraulic system independently of the pressure in the line system. In the prior art, between the outer circumference of the seat ring and the surrounding inner wall surface of the housing, a gap was present which permitted a pressure equalization between the annular space and the dead space or is provided for this purpose. Said gap is preferably closed off by means of the first seal.

It is advantageous if the first seal is designed as a piston seal and preferably has an O-ring and a slide ring seal or a slide ring, wherein the O-ring is preferably arranged on the rear side, averted from the inner wall surface, of the slide ring seal.

Basically any desired design of the first seal is possible. An embodiment as a piston seal or with an O-ring and a slide ring seal has however proven to be particularly suitable.

It is however basically also possible to realize a single-piece construction, possibly even only one O-ring, or a design as is provided in the case of the second seal.

In the case of a two-part or multi-part construction, provision may also be made whereby the O-ring bears against the inner wall surface and a pressure-exerting ring or some other element is arranged at the rear side, averted from the inner wall surface, of the O-ring.

It is preferable for the seat ring or the inner wall surface to have a groove, preferably an annularly encircling groove, into which the first seal is at least partially inserted. If necessary, it is also possible for grooves to be provided both in the seat ring and in the adjacent inner wall surface for the purposes of accommodating the first seal.

To optimize the hydraulic system according to the invention, it has proven to be particularly suitable for the first seal to close off a connection between the annular space and the dead space. To nevertheless be able to use a differential pressure system, in particular during normal operation, other measures may be incremented.

It is advantageous if the hydraulic system has a bypass line in order to produce a pressure equalization between the annular space and the dead space when required. The bypass line may be a line which runs within and/or outside the housing and/or a bore in the housing.

The bypass line makes it possible for a connection to be produced between the annular space and the dead space, in particular in order to be able to utilize the known differential pressure system.

It is advantageous if the hydraulic system has at least one shut-off element, for example a ball valve or a valve, in order to open or close the bypass line. Thus, the differential pressure system can be utilized when required, wherein, at the same time, in particular by means of a closure of the shut-off element, it can be ensured that the annular space can be pressurized, or the pressure can be reduced, even independently of the pressure in the line system.

According to the invention, provision may be made whereby the pressure that acts on the at least one seat ring can be set to the pressure in the line system and/or to a pressure higher than the pressure in the line system and/or to a pressure lower than the pressure in the line system.

The setting to a pressure which corresponds to the pressure in the line system may for example be realized in a particularly advantageous manner by virtue of a connection between the dead space and the annular chamber being opened, or it being ensured in some other way that the pressure in the line system also prevails in the annular space.

The controllability of the seat ring system is realized in particular through the production of a differential pressure between dead space and annular space.

A lower pressure in the annular space than the pressure in the line system and thus in the dead space causes the seat ring system to be lifted off from the ball surface.

A higher pressure in the annular space than in the dead space causes the seat ring system to be pressed with a relatively high and additional force against the ball.

This relatively high pressure in the annular space can be achieved in particular by virtue of the hydraulic system providing a corresponding pressure and it preferably being ensured that the pressure in the annular space does not or does not significantly escape. This may be realized for example through the closure of a corresponding shut-off element or the closure of a bypass line that leads to the dead space. Furthermore, this is preferably realized by virtue of an annular gap between the outer circumference of the seat ring and an inner wall surface of the housing being closed off by means of a seal, while preferably, at the same time, the pressure in the line system in the dead space is reduced by means of a shut-off element which is to be opened. For this purpose, the ventilation line, which is provided in the conventional manner, of the ball valve is advantageously opened to the atmosphere.

Alternatively, a pressure increase of the annular space is possible through the use of separate pressure generation (hydraulic pump or compressed-device).

A reduction of the pressure in the line system can preferably be realized in the same way by means of the hydraulic system. For this purpose, provision may preferably be made whereby, for example, the bypass line or some other line by means of which the pressure in the line system can be fed to the annular space is closed, and the hydraulic system at the same time ensures that, for example by means of the abovementioned hydraulic channels or a valve, pressure is released from the annular space, for example even to such an extent that the common atmospheric pressure prevails in the annular space.

It is also possible for the hydraulic system to be designed such that the pressure is actively discharged from the annular space, for example by virtue of the hydraulic medium being pumped out or suctioned out.

The pressure in the annular space is preferably generated by means of a liquid or gaseous medium. If a gaseous medium is transported through the line system, provision is preferably made whereby the hydraulic system also generates a gas pressure. If a liquid medium is transported through the line system, provision is analogously made for by the hydraulic system produces a corresponding pressure using a liquid medium.

According to the invention, provision may be made for a control device to be provided in order to control the hydraulic channels and/or a hydraulic unit such that a hydraulic pressure can be applied to the rear side of at least one of the seat rings independently of the medium flowing through the line system.

By means of a control device, the hydraulic pressure on the rear side of at least one of the seat rings can be set in a particularly simple manner.

It is advantageous if the control device is designed to reduce the hydraulic pressure at the rear side of the seat ring to a pressure below the pressure in the line system.

Therefore, according to the invention, the hydraulic device is provided not only for increasing the pressure in the annular space but also for reducing said pressure, in particular in order to adjust the ball valve, to a pressure below the pressure in the line system.

An alternative or additional possibility for pressing the seat ring against the ball plug will be presented below. In addition or alternatively to the pressure in the annular space being increased or lowered, provision may be made whereby the seat ring is pressed against the ball plug in the manner described below. The sealing and pressure-exerting device provided for this purpose and described below is suitable primarily for increasing the pressure on the seat ring, in particular for the pigging process. The inventors have however identified that the use, described below, of a sealing and pressure have exerting device is not necessary, because it is sufficient to correspondingly increase the pressure in the annular space as required without the additional sealing and pressure-exerting device, as described below, being required for this purpose. Nevertheless, in particular for specific uses, such an embodiment may additionally or alternatively be provided and expedient.

In the alternative or additional embodiment of the invention, provision may be made whereby a sealing and pressure-exerting device of annular form is inserted in the annular space or in the region of an outlet opening of the hydraulic channel. It may be advantageous here if the annular space has an axial extent greater than the axial extent of the sealing and pressure-exerting device, such that the sealing and pressure-exerting device is axially displaceable within the annular space. The displacement may in this case occur in a manner dependent on whether the hydraulic system is building up a hydraulic pressure, or a liquid or gaseous medium flowing through the line system is building up a corresponding pressure in the annular space.

It is advantageous if the sealing and pressure-exerting device has at least one O-ring and a pressure-exerting ring or a segmented ring. The pressure-exerting ring may preferably be formed from plastic, or else from metal. An embodiment as a PTFE ring, possibly with a glass fiber component, is particularly suitable. The O-ring is preferably arranged at the rear side, averted from the seat ring, of the pressure exerting ring. The combination of a preferably sealing O-ring and a pressure-exerting ring or a segmented ring has proven to be particularly suitable in order to exact a high pressure on the seat ring such that the seat ring is pressed against the ball plug.

In one design embodiment of the sealing and pressure-exerting device, provision may be made whereby the front side, facing toward the seat ring, of the pressure-exerting ring has notches, grooves or channels such that a liquid or gaseous medium can at least partially flow through between the front side of the pressure-exerting ring and the seat ring.

The inventors have identified that, in order to integrate the sealing and pressure-exerting device in a particularly advantageous manner, it may be advantageous if the sealing and pressure-exerting device is movable in the annular gap in an axial direction in a manner dependent on the side at which pressure is applied to the sealing and pressure-exerting device. Here, provision may be made whereby a hydraulic pressure is built up on the sealing and pressure-exerting device at the rear side thereof, that is to say at the side averted from the seat ring, if the hydraulic system according to the invention acts or is activated. Conversely, if medium which is typically liquid or gaseous during normal operation flows through the line system, a pressure may build up at the front side, facing toward the seat ring, of the sealing and pressure-exerting device. To prevent the sealing and pressure-exerting device from adhering to the seat ring and thus not being released in the event of a change of the pressure conditions, it is advantageous if the front side of the pressure-exerting ring is designed such that a liquid or gaseous medium can flow through between the front side of the pressure-exerting ring and the seat ring, or can pass under the front side of the pressure-exerting ring. The sealing and pressure-exerting device can thus be easily released from the seat ring if the pressure conditions change.

Below, a differential pressure system which is advantageous for the solution according to the invention will be described which can be used correspondingly or also in an altered manner with regard to the line routing, preferably in all embodiments. The differential pressure channel system is in particular suitable for ensuring sealing contact of the seat ring against the ball plug during normal operation, in particular even when the ball plug is not being rotated.

It is advantageous if the housing and/or the seat rings or at least one of the seat rings has a differential pressure channel system in order to push the seat rings (or the at least one seat ring) against the ball plug in a manner dependent on the pressure of the liquid or gaseous medium flowing through the line system.

Such differential pressure channel systems are well known from the prior art and are based substantially on the fact that, by means of the differential pressure channel system, it is achieved that the pressure which prevails in the line system acts on a surface, averted from the ball plug, of the rear side of the seat ring, which surface is larger than the surface at which the pressure acts on the front side of the seat ring. Now, if the surface at the rear side of the seat ring is larger than the surface at the front side, then, with increasing pressure in the line system, the pressure with which the seat ring is pushed against the ball plug increases. The pressure is, in simplified terms, determined from the formula "differential surface area" (surface area at the rear side minus surface area at the front side)×"pressure in the line system".

So-called "single piston" and "double piston" systems are known from the prior art. "Single piston" systems are used predominantly in the case of liquid (non-compressible) media. "Double piston" systems are used predominantly in the case of gaseous (compressible) media. In the case of "double piston" systems, the seat ring seals even in the presence of pressure loading from the dead space, that is to say from the annular space which is delimited at its inner side by the ball plug and at the outer side by the housing and in an axial direction by the two seat rings. In the case of the "single piston" design, the seat rings open, and release pressure, in the presence of pressure in the dead space, and thus permit an outflow of the medium from the dead space.

In the case of "double piston" systems, the inlet and outlet side are sealed off by means of the seat rings, whereas, in the case of the "single piston" systems, the outlet side can permit an outflow of medium.

It is advantageous if the hydraulic system has a hydraulic unit, for example a motor-operated pump, for generating and/or for reducing a hydraulic pressure and/or a port for the connection of a hydraulic unit for generating and/or for reducing a hydraulic pressure. The inventors have identified that it can suffice for one port to be provided for the connection of a hydraulic unit. This may if necessary even be merely a hand-operated pump. A hand-operated pump suffices in particular if the line system is to be cleaned or provision is made for a pig to be led through. In general, this is performed only once prior to the commencement of operation of the line system, and it may therefore be advantageous for cost reasons to provide only one port for a hydraulic unit.

Insofar as a use of the hydraulic system is also provided in order to vary, in particular also reduce, the pressure in the line system during operation also, for example when the ball valve is to be adjusted, it is advantageous if a corresponding hydraulic unit is permanently connected.

It is advantageous if the hydraulic system has a manometer and/or a pressure-limiting valve. To prevent damage in the line system, it is advantageous if the pressure can be set, monitored, and if necessary released, as exactly as possible.

The inventors have identified that, during the pigging process, it is advantageous for the hydraulic pressure of the hydraulic system to be selected such that the respective seat ring presses against the ball plug with a force which corresponds to a weight force of 5 to 20 tonnes, preferably 8 to 10 tonnes. In particular in combination with a spring device, which preferably imparts a force corresponding to a weight force of 2 to 2.5 tonnes, the result is therefore a force by means of which it is reliably ensured that the cleaning pig does not lift the seat ring off from the ball plug.

The solution according to the invention is suitable both for "single piston" systems and for "double piston" systems. The invention is also suitable for any seat rings irrespective of whether these impart a metallically sealing or soft-sealing action or whether a primarily metallically sealing and secondarily soft-sealing seal (sealing surface with respect to the ball plug) is provided.

In the case of a primarily metallically sealing and secondarily soft-sealing seat ring, a metallic seal plus an elastomer seal may be provided. Such a seal has proven to be particularly wear-resistant and insensitive to dirt. In the case of a soft-sealing seat ring, provision may be made whereby the sealing is realized by means of a sealing ring composed of plastic; here, use may for example be made of PTFE, PA or PEEK as materials. In the case of a metallically sealing seat ring, the sealing is realized by means of metallic contact with the ball plug.

The invention is basically suitable for ball valves with any diameters. It is however particularly suitable for large ball valves with a diameter of at least 14 inches (DN 350 mm), preferably at least 40 inches (DN 1000 mm), particularly preferably 42 (DN 1050 mm) to 60 inches (DN 1500 mm).

In the case of the method according to the invention for adjusting a ball valve, provision is made whereby the ball valve is integrated into a line system for conveying liquid or gaseous media and is adjusted in order to open and close pipelines, in which method, for the adjustment of the ball valve, a pressure which is generated by a medium, in particular a hydraulic medium, and which acts on a rear side, averted from a ball plug, of at least one of the seat rings is variable such that the pressure acting on the rear side is reduced to a pressure below the pressure in the pipelines. To achieve this, the hydraulic system according to the invention may be used in order to release pressure from the annular space, preferably via hydraulic channels, and to increase the pressure again after the adjustment of the ball valves, preferably to open a bypass line, in order to connect the annular space again to the pressure prevailing in the line system, for example by virtue of a connection to a dead space being produced.

Alternatively, for the adjustment of a ball valve, provision may also be made whereby the pressure system or the hydraulic system is designed so as to increase the pressure in the dead space, whereby the one or more seat rings are subjected to a force which lifts said seat ring(s) off, or seeks to lift said seat ring(s) off, from the contact with the ball plug. A combination of both measures, that is to say a reduction of the pressure in the annular space and an increase of the pressure in the dead space, is also possible.

It is advantageous if the method for adjusting a ball valve makes it possible for the seat ring to not bear against the ball plug, or to bear with only low pressure against the ball plug, when the ball plug is adjusted.

Preferably, for the adjustment of the ball plug, an operating mode is selected in which the pressure in the dead space corresponds to the pressure in the pipelines or to the pressure in the line system and only the atmospheric pressure prevails in the pressure system or hydraulic system.

In the method according to the invention for leading at least one pig through a ball valve inserted into a line system for liquid or gaseous media, which ball valve has a ball plug and seat rings, provision is made whereby one or more pigs are led through a line portion into which the ball valve is inserted. Here, it is the intention for at least one of the seat rings to be pressed against the ball plug by means of a pressure, in particular a hydraulic pressure, which is generated and controllable by a pressure system, in particular a hydraulic system. The pressure system, in particular the hydraulic system, is in this case configured to generate the pressure, in particular the hydraulic pressure, independently of the pressure in the pipelines.

The method provided according to the invention for leading at least one pig is suitable in particular for cleaning the ball valve and/or the line system, preferably prior to the commencement of operation.

The method according to the invention for leading at least one pig may be part of a method for cleaning.

According to the invention, provision may be made whereby the pressure system generates a pressure which is sufficient for pressing at least one of the seat rings, preferably both seat rings, against the ball plug and holding it/them in contact with the ball plug while the pig or the pigs is or are led through the ball plug.

In one refinement of the invention, provision may be made whereby, after the pig or the pigs has or have been led through the ball plug, the pressure which is generated by the pressure system and which presses at least one of the seat rings against the ball plug is reduced to such an extent that the at least one seat ring lifts off from the ball plug.

An embodiment of the method such that, after the pig or the pigs has or have been led through, one or both seat rings lift off from the ball plug makes it possible for dirt that has possibly come into contact with the seat ring or the sealing system or the sealing surfaces of the seat ring as a result of the pigging process to be flushed out or blown out, such that the dirt does not damage the sealing system or the sealing surfaces between the ball plug and the seat ring during the later actuation of the ball plug.

A lift-off of at least one seat ring can, as has basically already been described, be realized by means of various measures. Preferably, the pressure of the pressure system, with which the seat ring is pushed against the ball plug, is reduced. This may be realized for example by virtue of the annular space being charged with a relatively low pressure. Furthermore, provision may alternatively or additionally be made for the pressure system to be designed so as to introduce a pressure into the dead space, such that the seat ring or the seat rings is or are lifted off from the ball plug.

The hydraulic system according to the invention may be activatable and deactivatable in a manner controllable in open-loop or closed-loop fashion.

The solution according to the invention is also suitable as an emergency system. If, after relatively long periods of operation, the main seal in the seat ring of a ball valve exhibits wear or slight damage and thus leaks owing to dirt, it is possible with the solution according to the invention for the force on the seat ring to be increased, and thus for emergency sealing when the ball plug is closed to be achieved. It is the intention for these increased contact pressure forces to be maintained for the duration of the emergency measure. Switching of the ball plug is not provided for here.

In the method according to the invention for cleaning a ball valve, provision is made whereby the ball valve is integrated into a line system for conveying liquid or gaseous media and is adjusted in order to open and close pipelines. Provision is made here whereby the ball valve has a ball plug and seat rings. The method according to the invention for cleaning provides a pressure system which is designed to, independently of the pressure in the pipelines, generate a pressure which is fed to at least one of the seat rings such that the at least one seat ring is acted on with a force which pushes the seat ring away from the contact surface on the ball plug.

The method according to the invention for cleaning makes it possible for contaminants that have possibly passed into the region or the sealing system or the sealing surfaces between one of the seat rings and the ball plug to be removed, in particular flushed out or blown out, in particular before the ball plug is adjusted in order to open and close pipelines. By virtue of the seat ring being lifted off from the ball plug, the contaminants can be removed before they can damage the sealing system or the sealing surfaces as a result of the adjustment process of the ball plug. Such a method is in particular also suitable for removing contaminants after the pigging process, though may also be used independently of this. The operating mode according to this method may be implemented upon every adjustment process or after a particular number of adjustment processes or in a time-dependent manner or after the pigging process or in accordance with some other cycle, preferably prior to the initiation of an adjustment process.

In the method for cleaning a ball valve, provision may be made whereby the pressure generated by the pressure system is equal to or higher than the pressure in the pipelines.

Preferably, the pressure system introduces the pressure into a dead space such that the seat ring is acted on with a force which pushes, or seeks to push, said seat ring away from the ball plug. The pressure in the dead space is preferably higher than the pressure in the pipelines and/or in the line system. In this operating mode, an atmospheric pressure may preferably prevail in the feed lines of the pressure system to the annular space.

If only the atmospheric pressure prevails in the pipelines, even a pressure of a few bar in the dead space may suffice to lift the one or more seat rings off from the ball plug. In this case, it suffices if the pressure has a level which is sufficient to lift the seat rings off from the ball plug possibly counter to the force of a spring. By virtue of the one or more seat rings being lifted off from the ball plug, gas or fluid flows from the dead space into the pipelines, whereby contaminants, deposits or dirt can be blown out or flushed out. It is preferable for an atmospheric pressure to prevail in the feed lines of the pressure system to the annular space in this operating mode.

If a pressure higher than the atmospheric pressure, in particular a so-called pipeline pressure, prevails in the pipelines, provision may be made whereby the pressure that the pressure system applies to the dead space is correspondingly higher or is selected such that the one or more seat rings can nevertheless be lifted off from the ball plug and—as described—contaminants are blown out or flushed out as a result. In this case, too, it is advantageous if an atmospheric pressure prevails in the feed lines of the pressure system to the annular space.

A lift-off of the seat ring from the ball plug may also be realized in some other way, as already described above.

In the method according to the invention for sealing a ball valve, provision is made whereby the ball valve is integrated into a line system for conveying liquid or gaseous media and is adjusted in order to open and close pipelines. Provision is made here whereby the ball valve has a ball plug and seat rings. According to the invention, furthermore, a pressure system is provided which is designed to, independently of the pressure in the pipelines, generate a pressure which is fed to at least one of the seat rings such that the at least one seat ring is pressed against the ball plug such that a contact surface between the ball plug and the seat ring is sealed off even if a sealing surface of the at least one seat ring is damaged.

By means of the method according to the invention for sealing a ball valve, it is achieved in particular that an emergency system is provided, or an operating mode for emergency sealing, in which at least one, preferably both seat rings are pressed against the ball plug. For the emergency sealing, it is known from the prior art that, by means of correspondingly suitable boards in the seat ring, a viscous or secondary sealant is introduced which is then intended to perform an emergency sealing function, but control of the ball plug is there no longer possible. Here, the pressure system according to the invention offers an inexpensive, safe and reliable means for providing an alternative emergency system without the need for a viscous or secondary sealant.

The above-described advantageous embodiments of the ball valve are also suitable for the method according to the invention for adjusting or for cleaning or for sealing or for the pigging of a ball valve inserted in a line system.

The ball valve according to the invention and the methods according to the invention may all be realized with the same pressure system. The features, variants and embodiments described with regard to the ball valve according to the invention and the method according to the invention, including the exemplary embodiments described below on the basis of the drawing, may be combined with one another in any desired manner.

A particular advantage of the present invention consists in that the pressure system according to the invention can be operated with different operating modes. Here, the pressure system according to the invention is suitable both for "single piston" systems and for "double piston" systems. Four particularly advantageous operating modes will be presented briefly once again below as "switched state (seat rings lifted off)"; "emergency sealing"; "pigging operation" and "blowing-out".

An open-loop and/or closed-loop control device is preferably provided which makes it possible for the pressure system to be controlled in a suitable manner such that multiple, preferably all, operating modes can be realized.

In the "switched state (seat rings lifted off)", provision is preferably made whereby the pressure that is present in the pipelines, or the pressure in the line system, prevails in the dead space. The pressure system may in this case preferably be at atmospheric pressure.

In the "emergency sealing" operating mode, provision is preferably made whereby the seat rings are pressed with high force against the ball plug. For this purpose, in a pressure or hydraulic channel that opens into the annular space, a pressure is applied which is considerably higher than the pressure in the dead space.

In the "pigging operation" operating mode, similarly to the "emergency sealing" operating mode, provision is made whereby the pressure system generates a high pressure in order to press the seat ring against the ball plug. The implementation may be identical here, wherein, by contrast to the "emergency sealing", in the case of which a pressure above atmospheric pressure, specifically the so-called "pipeline pressure", generally prevails in the pipelines, only the atmospheric pressure prevails in the pipelines in the "pigging operation" operating mode, in order to permit a pigging operation.

In the "blowing-out" operating mode, provision may be made whereby the pressure in the dead space is higher than the pressure in the pipelines, whereas the pressure system, at least that part of the pressure system which opens into the annular space, is preferably at atmospheric pressure. Here, as already presented above, other variants are however also conceivable for permitting a lift-off of the seat ring.

Provision may preferably be made whereby, in all operating modes, during every switching process, cleaning between ball plug and the seat rings is performed, in particular a blowing-out or flushing-out process is performed.

BRIEF DESCRIPTION OF THE DRAWINGS

An exemplary embodiment of the invention is diagrammatically illustrated below.

In the figures.

WRITTEN DESCRIPTION OF THE PREFERRED EMBODIMENT

Ball plugs are well known from the general prior art, specifically both in terms of their structural design and with regard to their functioning for the purposes of opening and closing pipelines. Also known are various ball valves sealing systems, for which reason only the features essential to the invention will be discussed in more detail below.

In the exemplary embodiment, provision is made whereby the ball valve 1 is installed underground, though this is optional.

Figure 1:
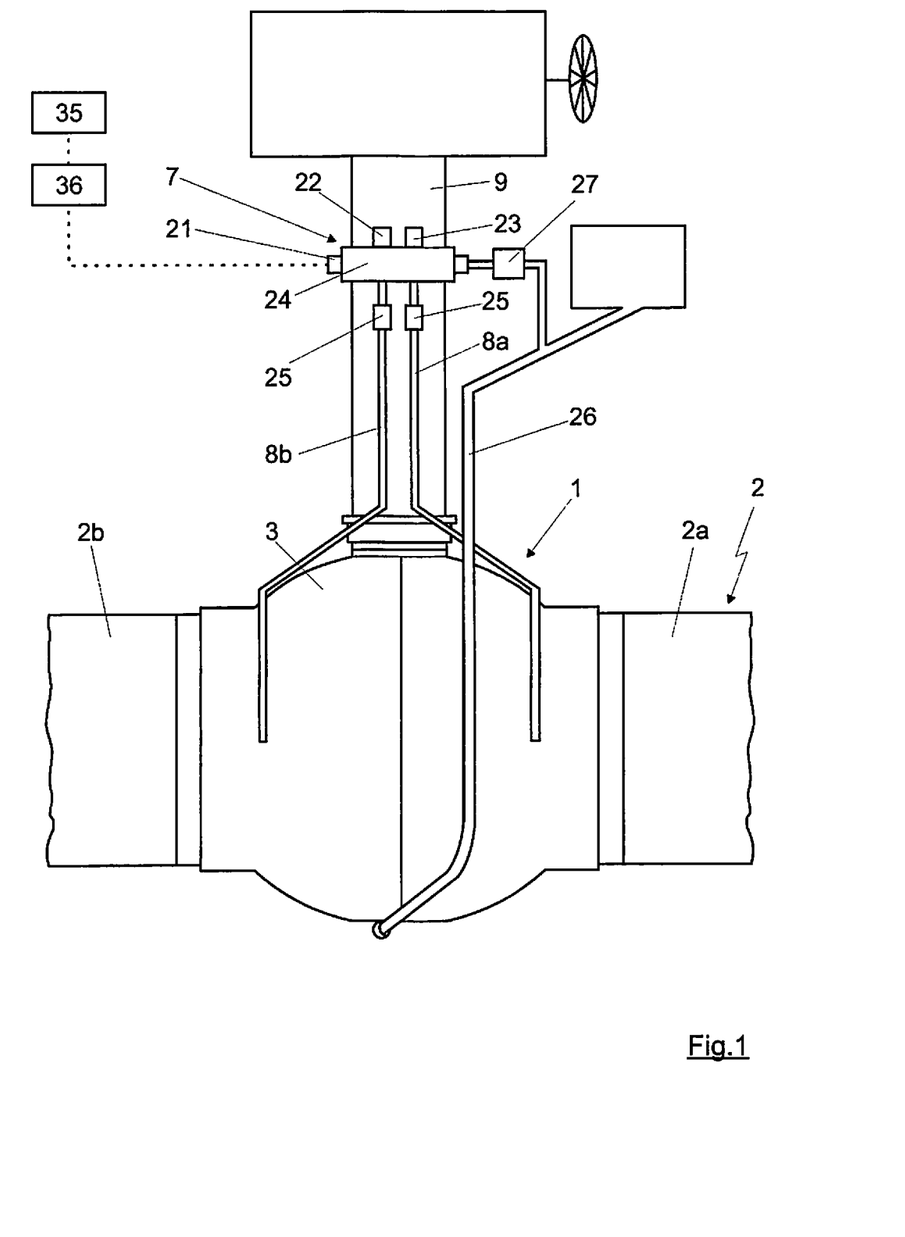
FIG. 1 shows a side view of a ball valve according to the invention which is inserted into a pipeline of a line system.
Figure 2:
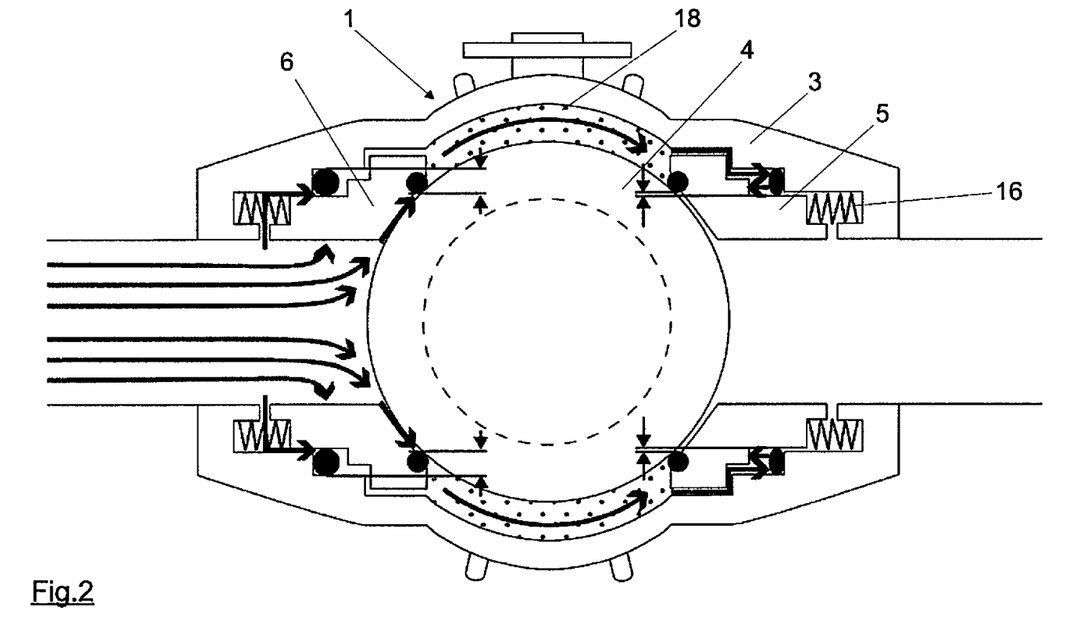
FIG. 2 shows a diagrammatic illustration of a section through a ball valve in a typical design as a "double piston" ball valve, without the hydraulic system according to the invention being illustrated.

FIGS. 1 and 2 diagrammatically show a ball valve 1 which is inserted into a line system 2 illustrated by two line pieces 2a, 2b. The line system 2 may serve for conveying liquid or gaseous media. In the exemplary embodiment, provision is made whereby a gaseous medium is transported through the line system 2. The exemplary embodiment is however not restricted to this.

The ball valve 1 according to the invention has a housing 3 which accommodates a ball plug 4 and two seat rings 5, 6. Merely for the purposes of illustrating the known functional principle, FIG. 2 illustrates a section through a ball valve, showing the housing 3, the ball plug 4 and the two seat rings 5, 6. This is also illustrated in detail form in FIGS. 3 and 4.

In the exemplary embodiment, the seat ring 5 is situated downstream of the seat ring 6, that is to say the medium flowing through the line system 2 passes firstly to the seat ring 6 and then to the seat ring 5. This is illustrated in FIG. 2 by the flow arrows.

The ball plug 4 is actuated by means of an actuating device 9 (see FIG. 1), that is to say the ball plug 4 can be rotated in order to open or close the line system 2.

FIG. 1 shows a diagrammatic illustration of the hydraulic system 7 according to the invention, to which the invention and the exemplary embodiments are not restricted. In the exemplary embodiment, provision is made whereby the hydraulic system 7 can push both seat rings 5, 6 hydraulically against the ball plug 4 as required, independently of the liquid or gaseous medium flowing through the line system 2.

The hydraulic system 7 comprises hydraulic channels 8a, 8b, which are suitable for feeding a hydraulic medium to a rear side 5a, 6a, averted from the ball plug 4, of the seat rings 5, 6, in order to build up a hydraulic pressure there.

Figure 3:
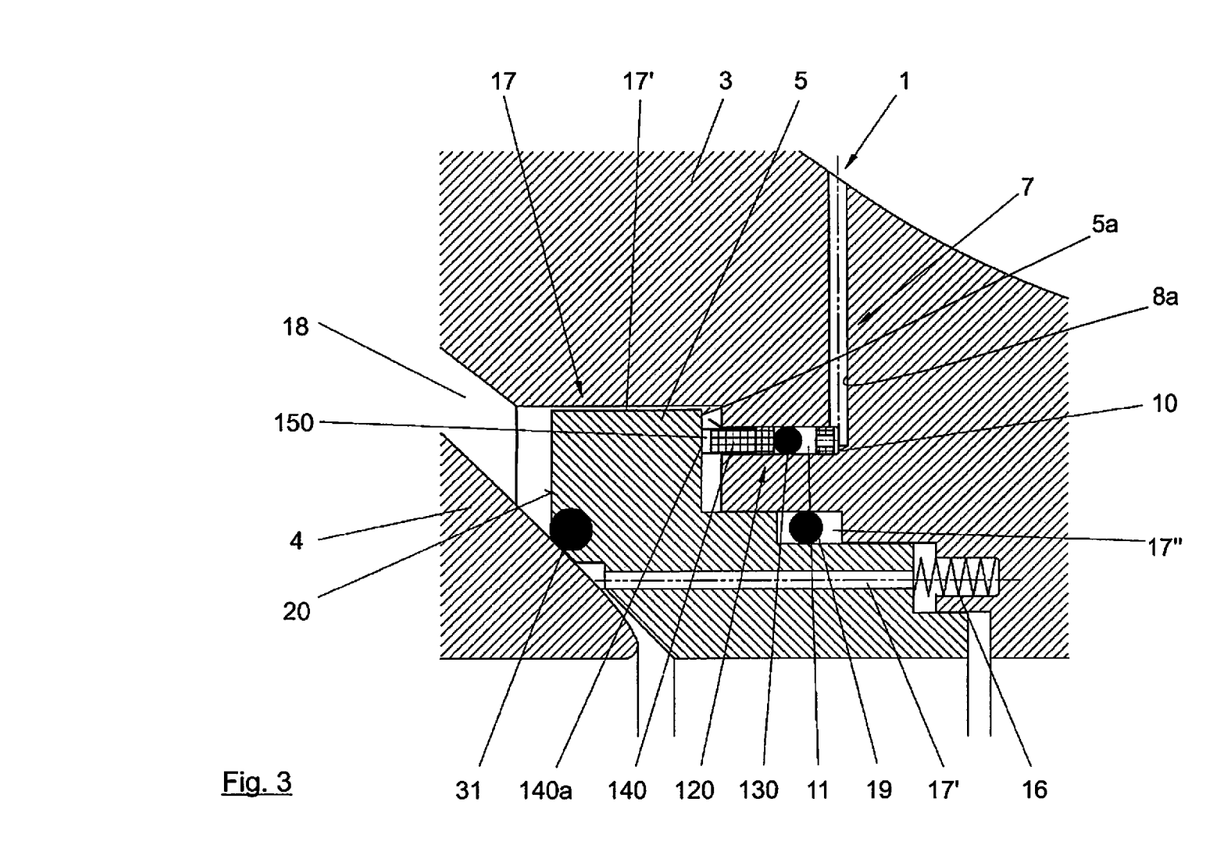
FIG. 3 shows a section through a ball valve in a first embodiment with a sealing and pressure-exerting device in a region in which a seat ring bears sealingly against a ball plug.
Figure 4:
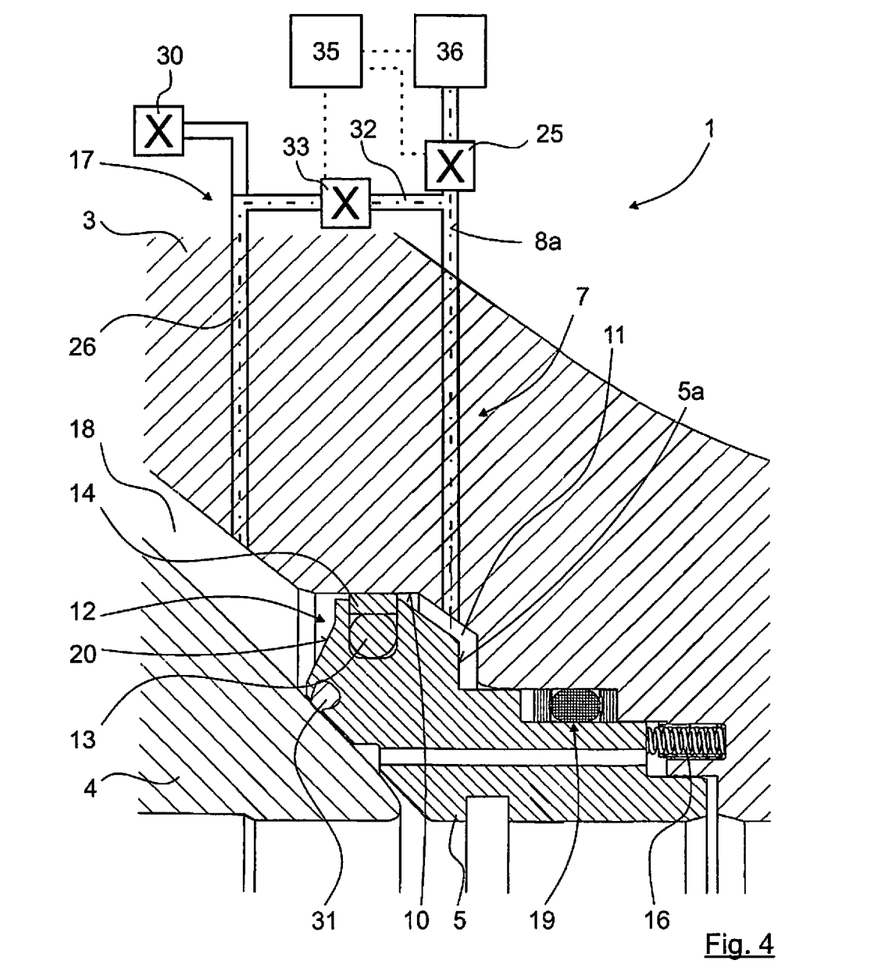
FIG. 4 shows a section through a ball valve in a second, preferred embodiment in a region in which a seat ring bears sealingly against a ball plug.

Of the hydraulic channel 8a, FIGS. 3 and 4 show substantially only one part, specifically the part that extends as a bore through the housing 3 to the rear side 5a of the seat ring 5.

FIG. 3 now shows one possible first embodiment of the invention, which may possibly be used independently of, but also in addition to, the preferred embodiment described below in FIG. 4.

Unless presented otherwise, individual features that have been described with regard to one of the two exemplary embodiments may also be used in the other exemplary embodiment.

As can be seen from FIG. 3, an annularly encircling annular space 11 with which the hydraulic channel 8a which feeds the hydraulic medium corresponds is formed between the rear side 5a of the seat ring 5 and an adjacent inner wall surface 10, facing toward the seat ring 5, of the housing 3. A sealing and pressure-exerting device 120 of annular form is inserted in the annular space 11. The sealing and pressure-exerting device 120 has, in the exemplary embodiment, an O-ring 130 and a pressure-exerting ring 140. The O-ring 130 is arranged at the rear side, averted from the seat ring 5, of the pressure-exerting ring 140. The front side 140a, facing toward the seat ring 5, of the pressure-exerting ring 140 has notches, grooves 150 or channels such that a liquid or gaseous medium can flow through between the front side 140a of the pressure-exerting ring 140 and the seat ring 5 or can penetrate below the front side 140a.

As also emerges from FIG. 3 and basically also from FIG. 2, the seat ring 5 has a spring device 16 for pressing the seat ring 5 against the ball plug 4. The spring device 16 may for example impart a force which pushes the seat ring 5 against the ball plug 4 with a force corresponding to a weight force of 2 to 2.5 tonnes.

In the exemplary embodiment as per FIG. 3, the housing 3 and the seat rings 5, 6 have a differential pressure channel system 17 for pushing the seat rings 5, 6 against the ball plug 4 in a manner dependent on the liquid or gaseous medium flowing through the line system 2. The exact course of the differential pressure channel system 17 is not of further relevance for this purpose. By means of the differential pressure channel system 17, it can be achieved that, if a pressure prevails in the line system 2, this acts on the rear side 5a, 6a of the seat rings 5, 6, wherein the rear side 5a, 6a of the seat rings 5, 6 has a larger surface area for the action of the pressure than the front side 20 of the seat rings 5, 6, such that, with increasing pressure, the seat rings 5, 6 are pushed with ever greater intensity against the ball plug 4. This basically also emerges from FIG. 2.

From FIG. 2, it is possible to see the principle of the "double piston" system. In said figure (and also in detail form in FIG. 3 and FIG. 4), a dead space 18 such as is conventional in the case of ball valves is also illustrated.

In the exemplary embodiment as per FIG. 3, during the normal operation of the line system 2, that is to say if pressure prevails in the line system 2, pressurized gas passes through the dead space 18 to the seat ring 5 also. Through a first differential pressure channel 17', the pressurized gas passes to the pressure-exerting ring 140 and displaces the latter in a direction away from the seat ring 5. As a result, the pressurized gas flows onward and consequently then passes into an annular space 17", which is part of the differential pressure channel system 17. A sealing element 19 can be arranged in a known manner in the annular space 17". The sealing element 19 is movable in an axial direction in the annular space 17". By means of the pressurized gas, the sealing element 19 is displaced in a direction away from the seat ring 5. In this way, at the rear side 5a of the seat ring 5, large surfaces are provided on which the pressurized gas acts. The seat ring 5 is thus pressed against the ball plug 4 counter to the pressure force acting on the front side 20 of the seat ring 5.

This basic concept is already known from the prior art, for which purpose reference is also made to FIG. 2, which shows the flow direction of a gas in relation to the exemplary embodiment illustrated in FIG. 3. In the context of the exemplary embodiment as per FIG. 3, the specific design of the differential pressure channel system 17 is not of importance, but the illustrated embodiment has nevertheless proven advantageous in conjunction with the sealing and pressure-exerting device 10 illustrated there.

In the embodiment as per FIG. 4, there is likewise—optionally—illustrated a differential pressure channel system, which is however implemented differently than in FIGS. 2 and 3 but performs the same function.

FIG. 1 shows the hydraulic system 7, which may have a port 21 for the connection of a hydraulic unit 36. The hydraulic unit 36 may for example be a pump with which the hydraulic pressure which acts on the seat ring 5 and/or the seat ring 6 can be varied or generated or reduced. Furthermore, FIG. 1 shows that the hydraulic system 7 may have a manometer 22 and/or a pressure-limiting valve 23. The pressure-limiting valve 23 may preferably be set to a pressure limit at the level of 40 bar, preferably 50 bar. Furthermore, the hydraulic system 7 may have a distributor block 24. In the exemplary embodiment, the hydraulic system 7 is fed from a merely diagrammatically illustrated hydraulic unit 36, which can be connected to the port 21. Via the distributor block 24, the hydraulic medium then passes into the hydraulic channels 8a, 8b, wherein a dedicated shut-off element, for example a shut-off valve 25, may be provided for each hydraulic channel 8a, 8b. The shut-off valves 25 may preferably be designed as ball valves.

The hydraulic channels 8a, 8b may have a throttle point (not illustrated), which is preferably positioned in the transition region to the annular space 11.

In a manner not illustrated in any more detail, the two seat rings 5, 6 may also be fed with the hydraulic medium from a common hydraulic channel, possibly with the omission of a distributor block.

As can also be seen from FIG. 1, the ball valve 4 has a dead space ventilation line 26 (illustrated merely by way of example) which serves for the ventilation of the dead space 18. The dead space ventilation line 26 may be connected to the hydraulic system 7 via a branch line. The branch line may in this case possibly have a shut-off element 27. The shut-off element 27 may for example have a pressure-limiting valve and/or a bypass valve.

The dead space ventilation line 26 is not essential but is advantageous for the invention.

As can be seen from FIG. 1 and also from FIG. 4, a control device 35 may be provided for controlling the hydraulic unit 36 and/or the hydraulic channels 8a, 8b and/or the shut-off elements 25 and 33 (as presented in more detail below with regard to FIG. 4). The control device 35 may permit automated switching, in the case of which the pressure in the annular space 11 is correspondingly set upon every switching process. The control device 35 is provided for controlling the hydraulic channels 8a, 8b and/or the hydraulic unit 36 such that a hydraulic pressure can be applied to the rear side 5a, 6a of at least one of the seat rings 5, 6 independently of the medium flowing through the line system. The control device 35 is in particular designed such that the hydraulic pressure at the rear side 5a, 6a of the seat ring 5, 6 can also be reduced to a pressure below the pressure in the line system.

A particularly suitable exemplary embodiment will be presented below on the basis of FIG. 4. In FIG. 4, no sealing and pressure-exerting device 120 is provided, wherein a combination with this would basically be possible.

In FIG. 4, provision is made whereby a hydraulic system 7 which is independent of the pressure of the liquid or gaseous medium flowing through the line system varies the contact pressure with which the seat ring 5, preferably both seat rings 5, 6, is or are pushed against the ball plug 4. This will be described below on the basis of a variation of the pressure on the seat ring 5.

The pressure acting on the seat ring 5 can be set to a pressure in the line system and/or to a pressure higher than that in the line system and/or to a pressure lower than that in the line system. The control device 35 may be provided for this purpose.

The hydraulic system 7 comprises the hydraulic channels 8a, 8b already described above, wherein FIG. 4 illustrates only the hydraulic channel 8a for conducting a hydraulic medium to, or discharging said hydraulic medium from, the rear side 5a of the seat ring 5 in order to vary the hydraulic pressure on the seat ring 5. Here, an annular space 11 such as is basically known is formed between the rear side 5a of the seat ring 5 and the inner wall surface 10, adjacent to the seat ring 5, of the housing 3, which annular space however differs from the annular space as per FIG. 3, as presented below. The annular space 11 corresponds to the hydraulic channel 8a which opens into the annular space 11.

By contrast to the illustration in FIG. 3, provision is made, in the case of the annular space 11 as per FIG. 4, that said annular space is delimited by a first seal 12 and a second seal 19, which are arranged such that the hydraulic medium fed from the hydraulic channel 8 generates a hydraulic force which acts directly on the rear side 5a of the seat ring 5.

As emerges from FIG. 4, the first seal 12 is arranged between the inner wall surface 10 of the housing 3 and the seat ring 5 in order to seal off the annular space 11 with respect to the dead space 18. During the normal operation of the line system, a pressure prevails in the dead space 18 which, as already described, corresponds to the pressure in the pipelines 2a, 2b of the line system through which the liquid or gaseous medium is transported.

By means of the embodiment illustrated in FIG. 4, an annular space 11 is created in which, independently of the pressure in the line system, a suitable or desired pressure can be set which may be equal to, lower than or higher than the pressure in the line system, in order to perform various functions.

In particular during the pigging process, it is possible by means of the hydraulic system 7 for a pressure to be set in the annular space 11, which pressure is of a magnitude which ensures that the pig does not lift the seat ring 5 off from the ball plug 4. In particular during the adjustment of the ball valve 1, a reduced pressure can be set in the annular space 11, which pressure permits an easy adjustment of the ball plug 4 and in particular prevents excessive loading of the seal between the seat ring 5 and the ball plug 4.

In the exemplary embodiment as per FIG. 4, the seal 12 is preferably in the form of a piston seal. The seal 12 preferably has an O-ring 13 and a slide ring seal 14 or a slide ring, wherein the O-ring 13 is preferably arranged on the rear side, averted from the inner wall surface 10, of the slide ring seal 14. The seal is preferably arranged at least partially in an annular groove of the seat ring 5.

In the exemplary embodiment as per FIG. 4, provision is preferably made whereby the hydraulic system 7 has a bypass line 32, which is illustrated by way of example, in order to produce pressure equalization between the annular space 11 and the dead space 18. Here, the hydraulic system 7 preferably has a shut-off element 33 (likewise illustrated merely by way of example), for example a shut-off valve, a ball valve or a valve, in order to open or close the bypass line 32, that is to say in order to connect the annular space 11 to, or shut off the annular space 11 with respect to, the dead space 18.

By means of the bypass line 32, it is possible to achieve that, during normal operation, that is to say when liquid or gaseous medium is transported through the pipelines 2, 3, the differential channel pressure system 17 which has already basically been described can also be used in the case of the ball valve 1 according to the invention as per FIG. 4. For this purpose, a shut-off element 25 which is merely diagrammatically illustrated in FIG. 4 may also be provided, which can be closed, such that the hydraulic device 36 is not activated or connected to the hydraulic channel 8*a*, or is activated or connected to the hydraulic channel 8*a* only when required. The arrangement of the shut-off elements 25, 33 in the lines is merely an example. The positioning may also be realized in any manner such that the desired control is possible. For this purpose, it is also possible for more or fewer shut-off elements 25, 33 to be provided. Alternatively, or in addition, use may also be made of a distributor block for controlling the hydraulic flow in the desired manner. In the event a closure of the shut-off element 33 and a corresponding opening of the shut-off element 25, it is possible, preferably with the aid of the control device 35, for the hydraulic device 36 to be controlled such that a desired pressure which is independent of the pressure in the line system can be set in the annular space 11.

It is advantageous if, in a method for adjusting a ball valve, the ball valve 1 is integrated in a known manner into a line system for conveying liquid or gaseous media. In accordance with the method according to the invention, it is possible, for the opening and closing of pipelines 2*a*, 2*b*, that is to say when the ball valve 1 or the ball plug 4 thereof is to be adjusted, for a pressure generated by means of a hydraulic medium and which acts on a rear side 5*a*, averted from a ball plug 4, of at least one of the seat rings 5 to be varied such that the pressure that acts on the rear side 5*a* of the seat ring 5 is reduced to a pressure below the pressure in the pipelines 2*a*, 2*b*.

By virtue of the pressure in the annular space 11 being reduced, the pressure prevailing at the front side 20 of the seat ring 5 is opposed by a lower or decreasing pressure, whereby the seal between the seat ring 5 and the ball plug 4 is relieved of load. By means of a corresponding reduction of the pressure in the annular space 11, it can also be achieved at the seat ring 5 is lifted off from the ball plug 4, or retracts.

A mechanical stop (not shown in any more detail in FIG. 4) may be provided in order to limit a lift-off of the seat ring 5.

For the ventilation of the annular space 11, a solenoid valve may be provided in a manner which is not illustrated.

The second seal 19 may be designed in any desired form, for example as an O-ring or, as illustrated in FIG. 4, in multi-part form, preferably as a grooved sealing ring, particular preferably as a double grooved sealing ring.

In the exemplary embodiment, provision may be made whereby the hydraulic system 7 is designed to generate a hydraulic pressure such that the respective seat ring 5, 6 is pushed against the ball plug 4 with a force corresponding to a weight force of 5 to 20 tonnes, preferably 8 to 10 tonnes, when a pig is led through the ball plug 4. The exact design is in this case also dependent on the dimensioning of the ball valve 1.

In the case of a method for leading a pig through the line system or the pipeline 2*a*, 2*b* and the ball valve 1, provision may be made whereby one or more pigs are led in succession through the line portion into which the ball valve 1 is inserted. A method for cleaning the line system or the ball valve 1 may for example be involved here. For this purpose, use may for example be made of cleaning pigs. Here, the seat rings 5, 6 can be blocked by means of the above-described application of a hydraulic pressure.

Figure 5:
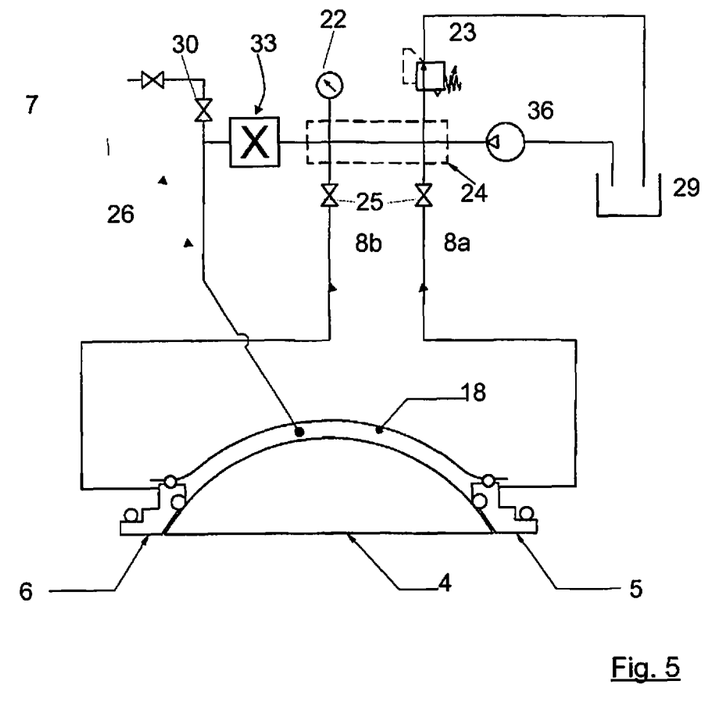
FIG. 5 shows a diagrammatic illustration of a circuit diagram of the hydraulic pressing of the seat ring against the ball plug in accordance with the invention.

FIG. 5 illustrates a highly schematic circuit diagram which is intended to serve merely for illustrative purposes and which restricts neither the invention nor the exemplary embodiments.

As can be seen from FIG. 5, it is possible by means of the hydraulic unit 36, which in the exemplary embodiment may be a pump, for a hydraulic medium to be fed to the distributor block 24. With closed-loop control by means of shut-off valves 25, the hydraulic medium passes via the hydraulic channels 8*a*, 8*b* to the rear side of the seat rings 5, 6 or is fed to the seat rings 5, 6 such that the seat rings 5, 6 are hydraulically loaded in the direction of the ball plug 4. From the dead space 18, and evacuation of the hydraulic medium can take place via the dead space ventilation line 26. Via a branch line and the shut-off element 33, which may be composed for example of a pressure-limiting valve and a bypass valve, the hydraulic medium preferably passes back into the distributor block 24, or, possibly also bypassing said distributor block, to a tank 29. A manometer 22 illustrated in FIG. 1 and a pressure-limiting valve 23 may be connected to the distributor block 24. The pressure-limiting valve 23 may preferably be set to a value of 50 bar.

The use of a dead space ventilation line 26 in conjunction with the shut-off element 33 and possibly further ball valves 30 is optional for FIG. 5. A distributor block 24 with the manometer 22 and the pressure-limiting valve 23 may also be dispensed with if appropriate.

In the exemplary embodiments, the invention has been described substantially on the basis of the seat ring 5; the seat ring 6 may be constructed and actuated in an identical manner. It is self-evidently also possible for only the hydraulic loading of one seat ring 5 or 6 to be provided by means of the hydraulic system 7.

In the exemplary embodiments, provision is made whereby the seat rings 5, 6, for the sealing with respect to the ball plug 4, have a sealing surface 31, which is provided preferably by a soft seal, particular preferably by an elastomer seal. The seat rings 5, 6 are preferably produced from metal.

The exemplary embodiments illustrated in the figures, in particular in FIGS. 3 and 4, are also suitable for carrying out a method for cleaning a ball valve 1 in which provision is made whereby the pressure system 7 is designed such that the pressure is generated independently of the pressure in the pipelines 2a, 2b and is fed to at least one of the seat rings 5, 6 such that the at least one seat ring 5, 6 is acted on with a force which pushes the seat ring 5, 6 away from the contact surface on the ball plug 4. This may preferably be achieved by virtue of the pressure system 7 being designed to introduce a pressure into the dead space 12. Corresponding lines or channels for introducing pressure into the dead space 12 are not illustrated in FIG. 3 but are easily conceivable. In the second embodiment illustrated in FIG. 4, provision may for example be made for this purpose whereby the dead space ventilation line 26 or an additional line which is not illustrated is correspondingly used. To assist the method, provision may furthermore be made whereby the pressure in the annular space 11 is reduced, for which purpose the hydraulic channels 8a, 8b may be used.

In the method for cleaning, provision may be made whereby the pressure system 7 is designed such that the pressure that is generated in the dead space 18 by the pressure system 7 is equal to or higher than the pressure in the pipelines 2a, 2b.

The method for cleaning a ball valve 1 may in particular also be used after the pigging process.

The method according to the invention for sealing a ball valve 1 may, in principle, likewise be realized with the exemplary embodiments illustrated in the figures, in particular the exemplary embodiment illustrated in FIGS. 3 and 4. Here, the method according to the invention for sealing provides that the pressure system 7, independently of the pressure in the pipelines 2a, 2b, generates a pressure which is fed to at least one of the seat rings 5, 6 such that the at least one seat ring is pressed against the ball plug such that a contact surface between the ball plug 4 and one of the seat rings 5, 6, preferably both seat rings 5, 6, is sealed off even if the sealing surface 31 or generally the sealing system of the at least one seat ring 5, 6 is damaged. Here, the pressure system 7 preferably increases the pressure in the annular space 11 correspondingly, for which purpose the hydraulic channels 8a, 8b may be correspondingly used.

The invention claimed is:

1. A ball valve for a line system for conveying liquid or gaseous media comprising:
a housing which has a ball plug and seat rings, and the seat rings contact the ball plug to provide a seal therebetween;
a hydraulic pressure system, which is independent of pressure of the liquid or gaseous medium flowing through the line system, and the hydraulic pressure system provides a pressure to and controllably varies contact pressure of at least one seat ring of the seat rings against the ball plug; and wherein
the hydraulic pressure system comprises at least one pressure channel for feeding a pressurized medium to, or discharging said pressurized medium from, a rear side, of the at least one seat ring of the seat rings, averted from the ball plug to vary the contact pressure exerted by the at least one seat ring of the seat rings on the ball plug; and wherein
an annularly encircling annular space with which the at least one, pressure channel corresponds, is formed between the rear side of the at least one seat ring of the seat rings and an adjacent inner wall surface, facing toward the at least one seat ring of the seat rings, of the housing; and wherein
the hydraulic pressure system has a bypass line to produce a pressure equalization between the annular space and a dead space which is situated between the seat rings and a top side of the ball plug and an inner all of the housing; and wherein
the hydraulic pressure system has at least one shut-off element to open and close the bypass line.

2. The ball valve as claimed in claim 1, characterized in that the annular space is delimited by a first seal and a second seal which are arranged such that the pressurized medium fed from the pressure channel generates a pressure force which acts directly on the rear side of the at least one seat ring of the seat rings.

3. The ball valve as claimed in claim 2, and wherein the first seal is arranged between the inner wall surface of the housing and the at least one seat ring of the seat rings and seals off the annular space with respect to the dead space, and wherein, during operation of the line system, a pressure prevails in the dead space which corresponds to the pressure in pipelines, of the line system through which the liquid or gaseous medium is transported.

4. The ball valve as claimed in claim 2, and wherein the first seal is a piston seal has an O-ring and a slide ring seal, and wherein the O-ring is arranged on the rear side, of the slide ring seal, averted from the inner wall surface.

5. The ball valve as c aimed in claim 1, and further comprising:
a sealing and pressure-exerting device; and
the sealing and pressure-exerting device is inserted in the annular space of the ball valve proximate an outlet opening of the pressure channel.

6. The ball valve as claimed in claim 1, characterized in that the pressure that acts on the rear side of the at least one seat ring of the seat rings can be set to the pressure that is the same as the pressure in the line system and can be set to a pressure that is different from the pressure in the line system.

7. The ball valve as claimed in claim 6 and further comprising:
a control device for controlling the pressure applied to the rear side of at least one seat ring of the seat rings independently of the liquid or gaseous media flowing through the line system.

8. The ball valve as claimed in claim 7, characterized in that the control device reduces the pressure at the rear side of the at least one seat ring of the seat rings to a pressure below the pressure in the line system.

9. The ball valve as claimed hi claim 1, characterized in that, for the at least one seat ring of the seat rings, a spring is provided for pushing the at least one seat ring of the seat rings against the ball plug.

10. A method for adjusting a ball valve as claimed in claim 1, and wherein the ball valve is integrated into a line system for conveying liquid or gaseous media, and the ball valve is adjusted to open and close pipelines, in which method, for the adjustment of the ball valve, a pressure which is generated by a hydraulic medium, and which acts on a rear side, of at least one seat ring of the seat rings averted from a ball plug is variable such that the pressure acting on the rear side is reduced to a pressure below the pressure in the pipelines.

11. A method for sealing a ball valve as claimed in claim 1 and further comprising the steps:
providing ball valve that is integrated into a line system having pipelines, for conveying liquid or gaseous media and the ball valve is adjusted in order to open and close the pipelines; and
the ball valve has a ball plug and seat rings that communicate with the ball plug to provide a seal therebetween; and providing a hydraulic pressure system that is independent from pressure in the pipelines, and the hydraulic pressure system generates a pressure which is fed to at least one seat ring of the seat rings so that the at least one seat ring of the seat rings is pressed against the ball plug so that a contact surface between the ball plug and the at least one seat ring of the seat rings is sealed off, even if a sealing surface of the at least one seat ring of the seat rings is damaged.

12. The ball valve as claimed in claim 1, and further comprising: a sealing and pressure-exerting device and the sealing and pressure-exerting device is proximate an outlet opening of the pressure channel.

13. A method for leading a pig through a ball valve inserted into a line system for liquid or gaseous media, and wherein the ball valve has an adjustable ball plug, and seat rings which contact the adjustable ball plug to provide a seal therebetween, the method comprising the steps:
providing a pressure system that communicates with the ball valve, and the pressure system is independent of a pressure in the line system generated by the liquid or gaseous media; and
the pressure system generates and controls a pressure that is communicated to the ball valve, and the generated and controlled pressure presses at least one seat ring, of the seat rings against the adjustable ball plug, and the generated and controlled pressure is sufficient for pressing at least one seat ring of the seat rings against the adjustable ball plug and holding the at least one seat ring of the seat rings in contact with the adjustable ball plug which the pig passes therethrough; and
leading the pig through pipelines of the line system into which the ball valve is inserted.

14. The method as claimed in claim 13 characterized in that, after the pig has been led through the ball plug, the pressure which is generated by the pressure system and which presses the at least one seat ring of the seat rings against the ball plug is reduced so that the at least one seat ring of the seat rings lifts off from the ball plug.

15. A method for cleaning a ball valve, in which method the ball valve (1) is integrated into a line system for conveying liquid or gaseous media and is adjusted in order to open and close pipelines (2a, 2b), in which method the ball valve (1) has a ball plug (4) and seat rings (5, 6), in which method a pressure system (7) is provided which is designed to, independently of the pressure in the pipelines (2a, 2b), generate a pressure which is fed to at least one of the seat rings (5, 6) such that the at least one seat ring (5, 6) is acted on with a force which pushes the seat ring (5, 6) away from the contact surface on the ball plug (4) and wherein the pressure generated by the pressure system (7) is fed to a dead space (18).

16. The method as claimed in claim 15, characterized in that the pressure generated by the pressure system (7) is equal to or higher than the pressure in the pipelines (2a, 2b).

* * * * *